United States Patent [19]

Kiffmeyer

[11] 3,810,118
[45] May 7, 1974

[54] PROGRAMMABLE MATRIX CONTROLLER

[75] Inventor: William W. Kiffmeyer, Bayside, Wis.

[73] Assignee: Allen-Bradley Company, Milwaukee, Wis.

[22] Filed: Apr. 27, 1971

[21] Appl. No.: 137,923

[52] U.S. Cl. .......................................... 340/172.5
[51] Int. Cl. .......................................... G05b 11/00
[58] Field of Search ................................ 340/172.5

[56] References Cited
UNITED STATES PATENTS

| | | | |
|---|---|---|---|
| 3,573,445 | 3/1971 | Korytnaja et al. | 340/172.5 X |
| 3,566,364 | 2/1971 | Hauck | 340/172.5 |
| 3,686,639 | 8/1972 | Fletcher et al. | 340/172.5 |
| 3,701,113 | 10/1972 | Chace | 340/172.5 |
| 3,753,243 | 8/1973 | Ricketts, Jr. et al. | 340/172.5 |

FOREIGN PATENTS OR APPLICATIONS 1,126,891  9/1968  Great Britain

*Primary Examiner*—Paul J. Henon
*Assistant Examiner*—Paul R. Woods
*Attorney, Agent, or Firm*—Barry E. Sammons

[57] ABSTRACT

A programmable logic controller operates to read the condition of a plurality of input devices and operate a plurality of output devices in accordance with a set of instructions contained in a stored program. Each instruction contains a six-bit address which is read by an address decoder to activate a specific input or output circuit connected to an external device. Each instruction also generates a two-bit operating signal which is transformed by an operation decoder into one of four separate operations. A central logic unit connects to the operation decoder, connects to receive condition signals from the input devices, and connects to the output devices. The central logic unit performs any one of the four operations: read the condition of an addressed input device; read the inverse condition of an addressed input device; store the result of the read operations; and set an addressed output device in accordance with the stored information.

22 Claims, 6 Drawing Figures

INVENTOR
WILLIAM W. KIFFMEYER

BY Barry & Sammons

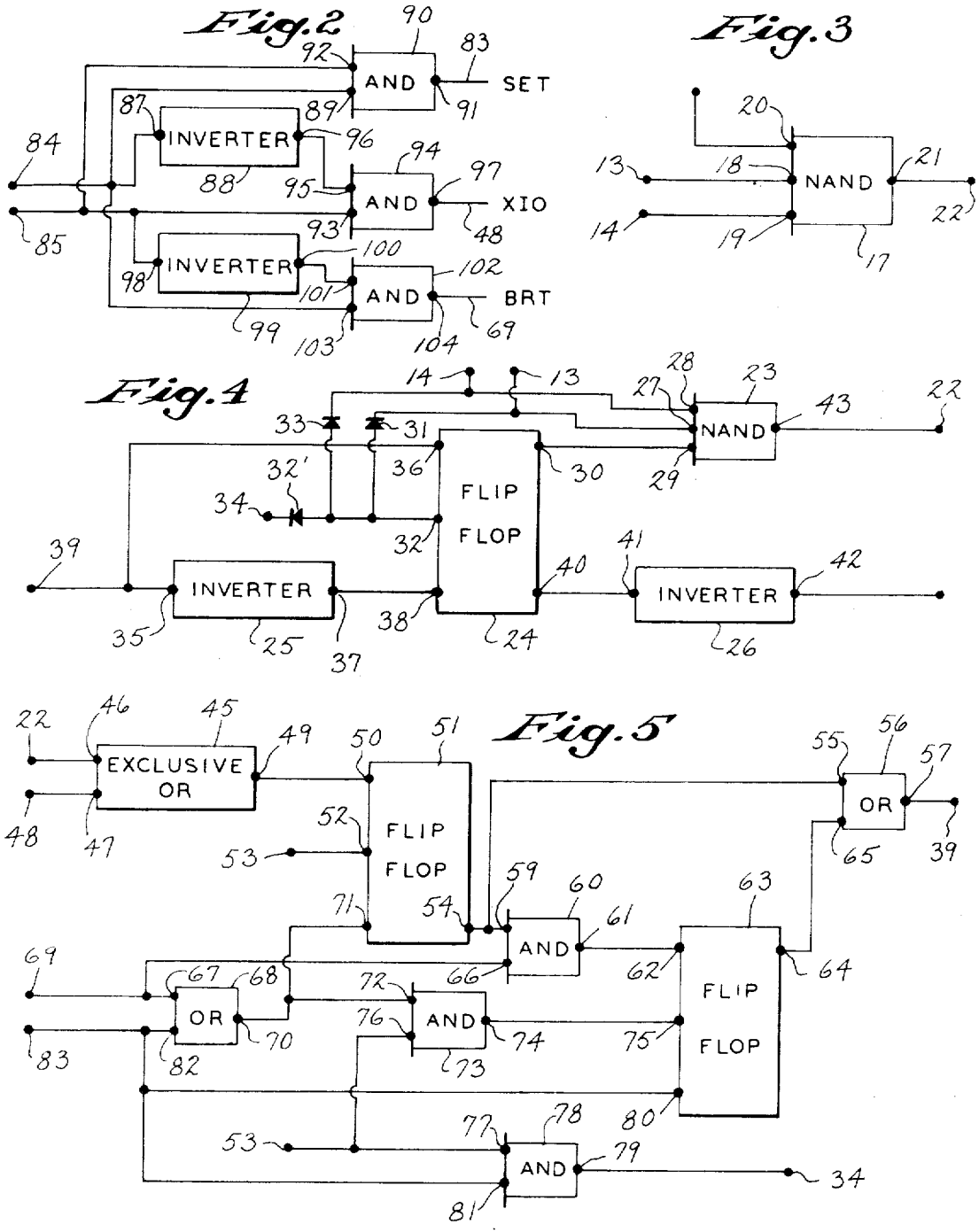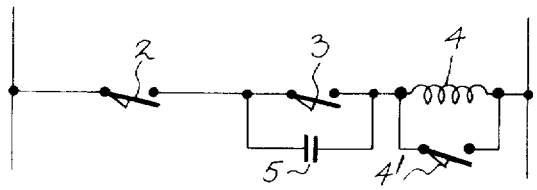

PROGRAMMABLE MATRIX CONTROLLER

BACKGROUND OF THE INVENTION

The field of the invention is programmable logic controllers used for automatically sequencing output devices such as motor starters, indicator lights, control valves and solenoids. Such controllers accept input signals which indicate the condition of various input devices such as limit switches, push buttons, solenoids and photo electric cells, compare these input conditions to the conditions specified in the stored program, and energize or deenergize output devices in accordance with the instructions in the program. More specifically, the field relates to programmable logic controllers which perform complex control jobs in accordance with a stored program, which program is readily changed to change the operating sequence of the controlled output devices.

Programmable logic controllers bridge the gap between relay circuits on the one hand, and digital computers on the other. Each of these control systems is capable of performing a specific control job, however, they are each distinguished in the marketplace by their cost, versatility and the ease with which they can be used for that specific job. For example, digital computers are highly versatile, however, they are very expensive both in terms of the initial hardware cost and the subsequent costs related to programming them. On the other hand, the commonly used relay control circuits and "hard wired" logic controllers lack versatility. When the operating sequence is changed, for example, when "debugging" the system or modernizing the controlled output devices, the control must often be rewired. With complex controls, such rewiring can occur often and becomes very expensive.

Although programmable logic controllers may be defined as a type of computer, such controllers have a number of features which distinguish them from the computer field generally. From a hardware standpoint, emphasis is placed on interfacing large numbers of input and output devices rather than providing expanded computational capabilities, whereas from a software standpoint, emphasis is placed on minimizing the skill and training necessary to program the controller, rather than providing more sophisticated and powerful languages. In solving control problems, a majority of control engineers determine the sequence of operation of various input devices and controlled output devices by the use of "ladder diagrams." Such persons are generally not trained to transfer their solution embodied in such diagrams to computer language and it is a characteristic feature of programmable logic controllers to provide means of simplifying this task.

Although programmable logic controllers can be distinguished from computers generally by their use of simplified program language, the objective of providing a programming procedure commensurate with the skills and training of the average user have met with only limited success. Prior programmable logic controllers utilize ten to twenty different instructions, with which the control engineer must become acquainted in order to transfer his control solution into machine language. Even then, prior controllers often use input coding circuits which translate the set of instructions into more complex machine languages. Such input devices are expensive — sometimes costing nearly as much as the controller itself. A programmable logic controller is needed which is adapted to use a simplified, readily understandable set of instructions without the use of expensive encoding circuits.

SUMMARY OF THE INVENTION

The present invention relates to a programmable logic controller which is operable to read the condition of a plurality of input devices and operate a plurality of output devices in accordance with a set of instructions contained in a stored program. The invented controller operates on a set of four operating instructions, which instructions are programmed by the user directly from a ladder diagram a logic diagram, or Boolean algebraic expressions. More specifically the controller comprises: a memory matrix adapted to store a plurality of instructions each in the form of a binary word, which words are read in sequence; an operation decoder connected to receive two bits in each word read from the memory matrix and generate one of four distinct operation signals in response thereto; an address decoder connected to receive the remaining bits in each word read from the memory matrix and generate an activate signal to one of a set of addresses in response thereto; a plurality of input circuits, each located at an address and having an input terminal adapted for connection to an external device, to receive a condition signal from the same and generate this signal to a logic input bus when an activate signal is received from the address decoder; a central logic unit connected to the logic input bus and connected to receive the operation signals from the operation decoder, the central logic unit being adapted to generate a command signal to a logic output bus in response to condition signals on said logic input bus and operation signals from the operation decoder; and a plurality of output circuits each located at an address and connected to the logic output bus, each output circuit having an output terminal adapted for connection to an external device to control the same when a command signal is generated at the output of the central logic unit and an activate signal is received at its address.

The central logic unit is operable in response to a first operation signal (XIC) to read the logic input bus and generate and store a command signal in a first storage means if a condition signal is present on the logic input bus. It is operable in response to a second operation signal (XIO) to read the logic input bus and to generate and store a command signal in the first storage means if a condition signal is not present on the logic input bus. It is operable in response to a third operation signal (BRT) to reset, or clear any command signal stored in the first storage means and shift it to a second storage means. And finally, it is operable in response to a fourth operation signal (SET) to read the first and second storage means and to generate a command signal to the logic output bus if a command signal is present in either storage means.

It is an object of the invention to provide a programmable logic controller which is easily programmed to perform control functions. The controller requires only four operating instructions, each of which bears a direct visual relation to a portion of a ladder diagram, a logic diagram and a Boolean algebraic equation. Consequently, the user can easily program the controller to perform a control job either directly from a ladder diagram, a logic diagram, or a set of Boolean equations.

No expensive input devices or circuits are required to transform the four operating instructions into machine language, for the controller uses the same set of four operating instructions to sequentially control the operation of the output devices.

Another object of the invention is to provide a means in each output circuit to read the condition of its attached output device. In essence, each output circuit is also an input circuit which generates condition signals to the logic input bus indicating the state of the output device. The output circuits are operable to control the external device in response to a command signal on the logic output bus only when a SET operation signal is generated by the operation decoder. They are operable to read the condition of the external device when either an XIO or XIC operation signal is generated by the operation decoder.

Another object of the invention is to provide a central logic unit having a minimal amount of hardware, and which is operable in response to only four operation signals to sequentially control a plurality of output devices in response to the condition of a plurality of input devices. The first and second storage means each have a one-bit capacity, requiring only two relatively inexpensive bistable circuits such as flip-flops to perform this function.

Still another object of the invention is to control all the output devices through a single logic output bus and read the condition of all the input devices through a single logic input bus. Minimizing the number of connecting lines between the input and output circuits and the central logic unit, substantially reduces the amount of hard wiring required and makes the use of printed circuit boards particularly advantageous.

The foregoing and other objects and advantages of the invention will appear from the following description. In the description reference is made to the accompanying drawings which form a part hereof, and in which there is shown a preferred embodiment of the invention. Such embodiment does not represent the full scope of the invention, but rather the invention may be employed in many different embodiments, and reference is made to the claims herein for interpreting the breadth of the invention.

BRIEF DESCRIPTION OF THE DRAWINGS

FIG. 2 is a schematic diagram of the operation decoder which forms a part of the present invention, FIG. 3 is a schematic diagram of an input circuit which forms a part of the present invention, FIG. 4 is a schematic diagram of an output circuit which forms a part of the present invention, FIG. 5 is a schematic diagram of the central logic unit which forms a part of the present invention, and FIG. 6 is as exemplary ladder diagram used an an aid in programming the controller of the present invention.

DESCRIPTION OF THE PREFERRED EMBODIMENT

Figure 1:
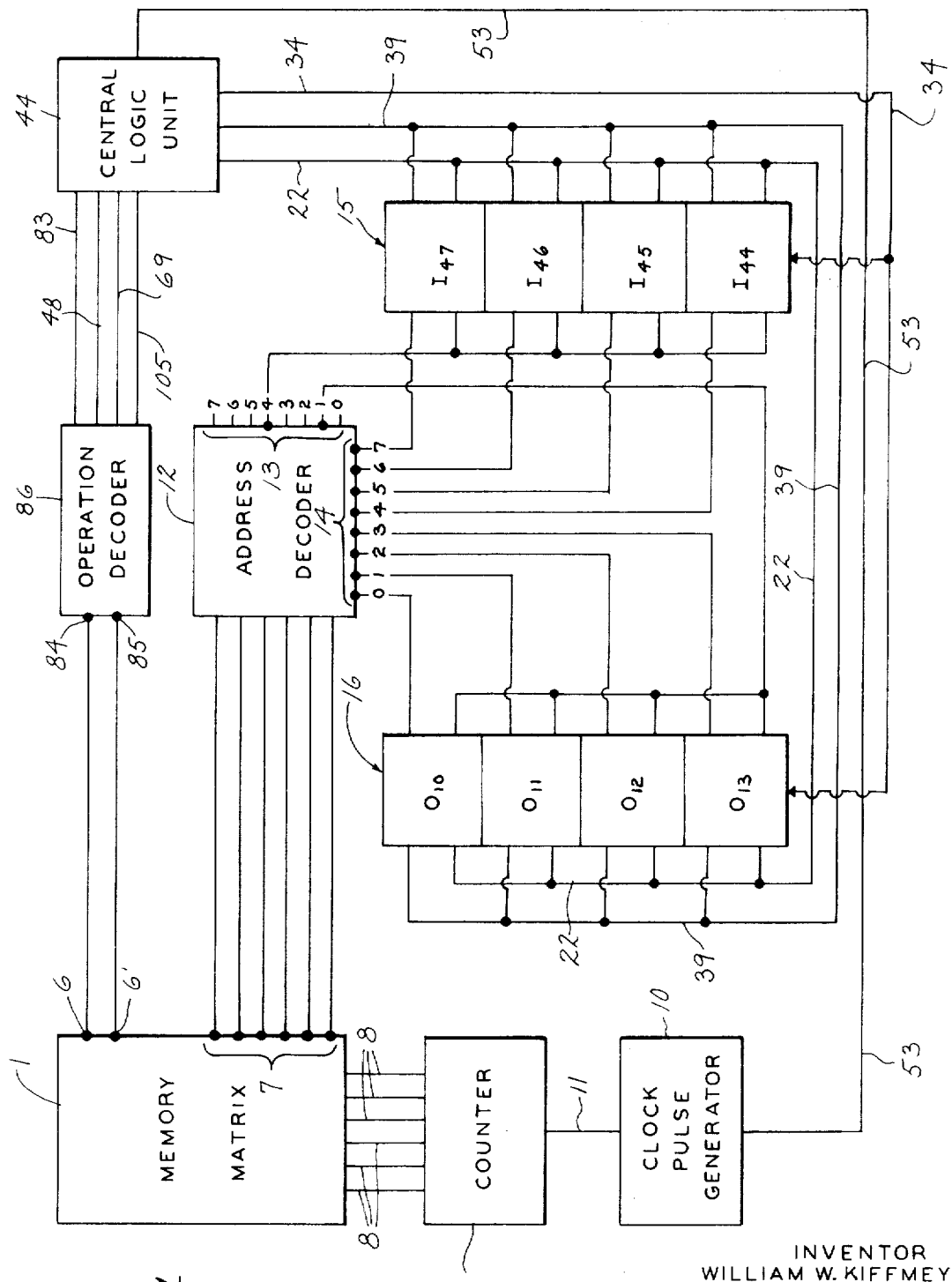
FIG. 1 is a block diagram of the controller of the present invention.

The digital controller as shown in FIG. 1 operates under the control of a program that is loaded into and stored in a memory matrix 1. The program is stored as a sequence of instructions, each instruction being a binary word which is eight bits (binary digits) in length. Each word, or instruction, consists of a two-bit operation code and a six-bit address code. The operation code defines the action to be taken by the digital controller, and the address identifies the particular input or output device that is to be read or actuated by the controller. For example, in the control system represented by the ladder diagram of FIG. 6, a first limit switch 2 is connected in series with a second limit switch 3 and a relay coil 4. A third limit switch 4' shunts the relay coil 4. When actuated, the relay coil 4 closes the normally open contacts 5, shunting the second limit switch 3. To provide this function, the digital controller is connected to sense the condition of the limit switches 2, 3 and 4' and connected to operate the relay coil 4. The four external devices in this example are each designated by a specific six-bit address code and the function which each is to perform in the control system is embodied in the two-bit operation code.

The memory matrix 1 is a diode matrix, or read only memory, having a capacity of 64 eight-bit words. The words are "read out" one at a time in sequence, and appear as eight digital signals one on each of two operator output lines 6 and 6' and one on each of six address output lines 7. The memory matrix 1 is a commercially available item which is operable in response to digital signals received at six input terminals 8 to read out one of the 64 words stored in it. A counter 9 is connected to a clock pulse generator 10 by means of a lead 11, and it generates a continuous series of six-bit digital signals to the memory matrix 1. These signals cause the program to be read out of the memory matrix 1, one instruction at a time in synchronism with the 100 kHz square waves generated by the clock pulse generator 10. When the last instruction is read out, the sequence is repeated, thus rereading the program. It should be apparent to those skilled in the art that core memories or other memory devices can be substituted for the read only memory used herein, and additional memory matrices can be added when programs containing more than 64 instructions are stored.

Each word in the memory matrix 1 has a six-bit binary address code which is read out as signals through the address output terminals 7. An address decoder 12 is connected to receive these address output signals. Each set of address signals represent one of the octal numbers 0 through 77. The address decoder 12 is a standard circuit which reads each set of address signals and generates in response thereto an activate signal at one of eight most significant digit output terminals $13_{0-7}$ and at one of eight least significant digit output terminals $14_{0-7}$. For example, when the octal number, or address 47 is contained in an instruction which is read out of the memory matrix 1, the address decoder 12 generates a positive activate signal at the most significant digit output terminal $13_4$ and the least significant digit output terminal $14_7$.

Each of the output terminals $13_{0-7}$ is paired with one of the output terminals $14_{0-7}$ to form a set of 64 separate addresses. Physically, each address is a unique pair of leads connected to the address decoder 12. In the preferred embodiment, the leads for a set of four addresses are connected to a plug, into which a printed circuit board containing four input or output circuits is inserted. Thus, as shown schematically in FIG. 1, the address decoder 12 is connected to an input deck 15 and an output deck 16, each deck 15 or 16 containing four addresses and each address connected to a pair of address decoder outputs 13 and 14. To avoid confusion, the remaining decks or their connection to the address decoder 12 are not shown.

The designation "input deck" or "output deck" is determined by the circuits which are contained on that deck. Referring to FIG. 1, the four input circuits contained on the input deck 15 are identified by their octal addresses, $I_{44}$ through $I_{47}$. Similarly, the four output circuits contained on the output deck 16 are designated by their octal addresses, $O_{10}$ through $O_{13}$. The remaining decks, not shown, may be input decks or output decks. Regardless of the circuit contained therein, positive activate signals will be generated by the address decoder on both lines leading to the programmed address, and the circuit connected to that address will thus be activated or "addressed."

As shown in FIG. 3, each input circuit is comprised of a NAND gate 17. Each NAND gate 17 has an input terminal 18 connected to a most significant digit output terminal 13 of the address decoder 12, and an input terminal 19 connected to a least significant digit output terminal 14 of the address decoder 12. A third NAND gate input terminal 20 is connectable to an external device such as a limit switch. Although the choice of polarity is arbitrary, a high condition signal is received at the input terminal 20 from such an external device when it is actuated or closed. For example, if a limit switch is connected to the input terminal 20, its opposite terminal is connected to logic high. When the NAND gate 17 is addressed, therefore, its input terminals 18, 19 and 20 are all high, and a logic low is generated at its output terminal 21 when the external device is closed. The output terminal 21 of each NAND gate 17 is connected to a single logic input bus 22. Thus, if an addressed input circuit receives a condition signal from the external device to which it is attached, a logic low is applied to the logic input bus 22.

Referring to FIG. 4, the output circuits each include a NAND gate 23, a J-K flip-flop 24, an input inverter 25, and an output inverter 26. Two input terminals 27 and 28 on the NAND gate 23 connect to a pair of address decoder output terminals 13 and 14 respectively. A third NAND gate input terminal 29 connects to a Q terminal 30 on the J-K flip-flop 24. The NAND gate input terminal 27 connects through a first coupling diode 31 to a clock terminal 32 on the J-K flip-flop 24, and the NAND gate input terminal 28 connects through a second coupling diode 33 to the clock terminal 32. An output terminal 43 on the NAND gate 23 of each output circuit connects to the logic input bus 22. The clock terminal 32 of each output circuit connects through a diode 32' to clock pulse bus 34. An input terminal 35 of the input inverter 25 connects to a J terminal 36 on the flip-flop 24 and an output terminal 37 on the input inverter 25 connects to a K terminal 38 on the flip-flop 24. The input terminal 35 and the J terminal 36 of each output circuit connects to a single logic output bus 39. A Q terminal 40 on the flip-flop 24 connects to an input terminal 41 of the output inverter 26. A output terminal 42 of the inverter 26 is connectable to an external device such as a motor starter or other controlled device. For example, such a device might be the normally open contacts 5.

The J-K flip-flop 24 functions to both control the output device connected to the output terminal 42, and to indicate the state, or condition, of that output device. The J-K flip-flop 24 is a standard commercially available circuit which is bistable in either a reset or set state. When reset, its Q terminal 30 is low and its Q terminal 40 is high. The flip-flop 24 is set by the trailing edge of a negative clock pulse applied to its clock terminal when the output circuit is addressed through the coupling diodes 31 and 33 and when its J terminal 36 is high. When the thus set, the Q terminal 30 goes high and the Q terminal 40 goes low. The low at Q terminal 40 is inverted to a high by the output inverter 26 and applied to actuate the controlled device connected to the output terminal 42. The flip-flop 24 is reset by the trailing edge of a clock pulse applied to its clock terminal 32 when addressed and when a high is applied to its K terminal 38. When addressed, the NAND gate input terminals 27 and 28 are high and the condition of the Q terminal 30 of the flip-flop 24 is applied to the logic input bus 22. Thus, when the controlled device connected to output terminal 42 is being actuated, the Q terminal 30 is high and the output terminal 43 of the NAND gate 23 applies a low to the logic input bus 22. On the other hand, when the controlled device is not actuated, the logic input bus 22 goes high when the output circuit is addressed.

As described above, a logic low is applied to the logic input bus 22 each time an external device is closed and the input circuit to which it is attached is addressed. Similarly, a logic low is applied to the logic input bus 22 when an externally controlled device is being actuated and the NAND gate 23 in the output circuit to which it is attached is addressed. An externally controlled device becomes actuated when the flip-flop 24 of the output circuit to which it is attached is set, that is, when the circuit is addressed, when a command signal is applied to the logic output bus 39, and when a clock pulse is applied to the clock pulse bus 34. The command signal referred to herein is a logic high, however, it should be apparent to those skilled in the art that the polarity can be shifted by the appropriate removal or insertion of inverters, substitution of different logic gates, and reversal of appropriate connections. Consequently, the term "command signal" as used herein, indicates a one-bit digital signal which commands that a specific controlled external device be in one of its two controllable states.

The logic input bus 22, the logic output bus 39, and the clock pulse bus 34 connect to a central logic unit 44. Referring to FIG. 5, the central logic unit 44 includes an exclusive OR gate 45 having a first input terminal 46 connected to the logic input bus 22 and a second input terminal 47 connected to an XIO bus 48. An output terminal 49 of the exclusive OR gate 45 connects to a J terminal 50 of a first J-K flip-flop 51. The first J-K flip-flop 51 is similar to the flip-flops 24 used in the output circuits described above, and includes a clock terminal 52 connected to the clock pulse generator 10 through a timing bus 53. The first flip-flop 51 has a Q terminal 54 connected to a first input terminal 55 of an output OR gate 56 and an output terminal 57 on the output OR gate 56 connects to the logic output bus 39. The Q terminal 54 also connects to a first input terminal 59 of a branch AND gate 60. An output terminal 61 of the branch AND gate 60 connects to a J terminal 62 on a second J-K flip-flop 63. The second J-K flip-flop 63 is similar to the first J-K flip-flop 51 and has a Q output terminal 64 connected to a second input terminal 65 of the output OR gate 56. A second input terminal 66 on the branch AND gate 60 connects to a first input terminal 67 of an input OR gate 68 and to a BRT bus 69. An output terminal 70 of the input OR gate 68 connects to a K terminal 71 on the first J-K flip-flop 51 and a first input terminal 72 of a store AND gate 73. An output terminal 74 of the store AND gate 73 connects to a clock terminal 75 on the second J-K flip-flop 63. A second input terminal 76 on the store AND gate 73 connects to the timing bus 53 and to a first input terminal 77 of a set AND gate 78. An output terminal 79 of the set AND gate 78 connects to the clock pulse bus 34. A K input terminal 80 on the second J-K flip-flop 63 connects to a second input terminal 81 on the set AND gate 78, a second input terminal 82 on the input OR gate 68, and to a SET bus 83.

The central logic unit 44 performs four separate operations which are referred to herein as XIO, XIC, BRT and SET. It operates to read (XIO, XIC) the condition of the logic input bus 22, store (BRT) this information, and generate command signals (SET) to the logic output bus 39. To better understand these four operations of the central logic unit 44, the functions indicated by the ladder diagram in FIG. 6 will be explained.

If switch 2 is closed

AND

If switch 3 is closed

AND

If switch 4' is open

OR

If switch 2 is closed

AND

If contacts 5 are closed

AND

If switch 4' is open then

Actuate relay coil 4

Before the first function is performed by the controller, both J-K flip-flops 51 and 63 are reset. To determine whether the first limit switch 2 is closed, an instruction addresses the input circuit to which it is attached and reads the logic state of the input bus 22. This is an examine input closed (XIC) instruction during which the BRT, SET, and XIO buses 69, 83 and 48 are low, and a clock pulse is received at the clock terminal 52 of the first flip-flop 51. If the first limit switch 2 is closed, the logic input bus 22 is low and as a consequence, the J terminal 50 of the first flip-flop 51 is low. When the trailing edge of the clock pulse is received, therefore, nothing happens and the first flip-flop 51 remains reset. If, on the other hand, the first limit switch 2 is open, the J terminal 50 is positive and the first flip-flop 51 is set by the trailing edge of the clock pulse. The second instruction addresses the input circuit to which the second limit switch 3 is connected and the logic input bus 22 is again read (XIC) to determine if the switch 3 is closed. Again, if it is closed, the J terminal 50 is low and the flip-flop 51 remains unchanged after the instruction is performed. As a result of the first two instructions, if either, or both, switches 2 and 3 are open, the conductive branch defined by them is open and the first flip-flop 51 is a in a set state. The third instruction addresses the input circuit to which the switch 4' is attached and reads (XIO) the logic input bus 22 to determine whether switch 4' is open. This operation is performed by generating a logic high on the XIO bus 48 which is applied to the exclusive OR gate 45. As a result, the condition of the logic input bus 22 is inverted by the exclusive OR gate 45 before application to the J terminal 50 of the first flip-flop 51. If switch 4' is open, therefore, first flip-flop 51 remains unchanged, if not, first flip-flop 51 is set.

The next step is to examine the condition of the alternate conductive branch comprised of the first limit switch 2, the normally open contacts 5, and the third switch 4'. Before this is performed, however, the information regarding the first conductive branch is shifted from the first flip-flop 51 to the second flip-flop 63. This is accomplished by a branch (BRT) operation in which the BRT bus 69 is held high during the generation of a clock pulse to the flip-flops 51 and 63. This high on the BRT bus 69 is conducted to the branch AND gate input terminal 66, and the logic state of the Q terminal 54 of the first flip-flop 51 is applied to the J terminal 62 of the second flip-flop 63. Concurrently, the high on BRT bus 69 is administered to the K terminal 71 of the first flip-flop 51 to reset it with the trailing edge of the clock pulse. A clock pulse is applied to the second flip-flop 63 through the store AND gate 73 and as a result, the condition of the first conductive branch is shifted, or stored in the second flip-flop 63.

The second conductive branch is now examined by a pair of XIC instructions addressed to the first limit switch 2 and the normally open contacts 5, followed by an XIO instruction addressed to the third limit switch 4'. It should be noted that the condition of the contacts 5 can be determined by addressing the output circuit connected to the relay coil 4 since the state of the flip-flop 24 therein is determinative of its condition. The central logic unit 44 operates as described above in regard to the first branch, and as a result, if either or both switch 2 or contacts 5 are open, or switch 4' closed, Q terminal 54 will be low after the instructions are performed.

After examining both branches, the next step is to operate the relay coil 4, or contacts 5 in accordance with the conditions of the two branches stored in the flip-flops 51 and 63. This is accomplished by addressing the output circuit to which the relay coil 4 is attached with a SET instruction. A logic high is applied to the SET bus 83 and as a result, a clock pulse is conducted through the set AND gate 78 and to the clock pulse bus 34 attached to the clock terminals 32 of the output circuit flip-flops 24. In the above example, if the components in neither branch tested were in condition to actuate the relay coil 4, the first flip-flop Q terminal 54 is low and the second flip-flop Q terminal 64 is low during the SET instruction and no command signal, or logic high, is generated to the logic output bus 39. On the other hand, if either branch was in condition to actuate the coil 4, one of the terminals 54 or 64 is high during the SET instruction and a command signal is applied to the logic output bus 39.

The SET instruction also operates to place the first and second flip-flops 51 and 63 in their reset state. The logic high on the SET bus 83 is applied directly to the K terminal 80 on the second flip-flop 63 and through the input OR gate 68 to the K terminal 71 of the first flip-flop 51.

The four operations, XIO, XIC, BRT and SET, are decoded from a two-bit digital operation code read at the two operator output terminals 6 and 6' of the memory matrix 1. These output terminals 6 and 6' are connected to two input terminals 84 and 85, respectively, of an operation decoder 86. As shown in FIG. 2, the input terminal 84 of the operation decoder 86 is connected to an input terminal 87 of a first inverter 88, and an input terminal 89 of a first AND gate 90. An output terminal 91 of the first AND gate 90 connects to the SET bus 83, and a second input terminal 92 connects to the operation decoder input terminal 85. A first input terminal 93 of a second AND gate 94 also connects to the operation decoder input terminal 85, and a second input terminal 95 connects to an output terminal 96 on the first inverter 88. An output terminal 97 on the second AND gate 94 connects to the XIO bus 48. An input terminal 98 on a second inverter 99 connects to the operation decoder input terminal 85. An output terminal 100 on the second inverter 99 connects to an input terminal 101 on a third AND gate 102, a second input terminal 103 on the third AND gate 102 connects to the operation decoder input terminal 84 and an output terminal 104 connects to the BRT bus 69.

The operation decoder 86 receives the two-bit digital operation code each time a word stored in the memory matrix 1 is read. Four separate operation instructions are embodied in this binary signal, three of which are decoded by the operation decoder 86 to generate three operation signals, or logic highs, on the buses 48, 69 and 83 connected to the central logic unit 44. The fourth operator, XIC, is not decoded for as is evident from the description of the central logic unit 44 above, this operation is performed when the remaining three operators, SET, XIO, and BRT, are absent. A fourth line 105 is shown in FIG. 1 connecting the operation decoder 86 and central logic unit 44. The line 105 represents the generation, at least in theory, of the fourth operation signal, XIC, to the central logic unit 44, although in the preferred embodiment shown herein this operation is initiated by default rather than by a digital signal.

Although the central logic unit 44 has two storage means each with a one-bit capacity, the controller is not limited in the number of input devices or conductive branches which can be examined between SET instructions. The first flip-flop is responsive to store any "failure" in a conductive branch, and since the failure of any single input device in a branch is sufficient to prevent actuation of the output device through that branch, only one such failure need be stored by the first storage means. On the other hand, only one branch need be complete to actuate the output device, and consequently, the second storage means need store only a single success regardless of the number of branches examined. Thus, with a minimal amount of hardware and only four distinct operating instructions, a large number of control jobs can be performed by the controller. Furthermore, with only four operating instructions programming is simplified considerably. This feature is enhanced further by the direct correlation between each operating instruction and a component in a ladder diagram or an operator in a Boolean equation.

I claim:

1. A controller comprising:

a memory matrix operable to store a plurality of binary words and including means to selectively read said words;

a logic input bus;

a plurality of input circuits, each input circuit being operable to receive a condition signal from an external device and generate said condition signal to the logic input bus when it is addressed;

a logic output bus;

a plurality of output circuits connected to the logic output bus, each output circuit being operable to actuate an external device in response to a command signal on said logic output bus when it is addressed;

an address decoder connected to said memory matrix to receive an address code in each word read from said memory matrix and being operable in response thereto to selectively address an input or output circuit by generating an activate signal thereto; and a central logic unit having first and second storage means connected to said memory matrix to receive four distinct operation signals read from said memory matrix, said central logic unit also being connected to said logic input and logic output buses;

wherein said central logic unit is operable in response to a received operation signal said operation signals to perform one of said four distinct associated operations; said associated operations including not more than the following four distinct operations, (1) examine the condition of an external device connected to an addressed input circuit and store the result in said first storage means, (2) examine the condition of an external device connected to an addressed input circuit and store the inversion of the result in said first storage means, (3) shift the results stored in said first storage means to said second storage means, and (4) generate a command signal to said logic output bus which is responsive to the results stored in both storage means.

2. The controller as recited in claim 1 in which said central logic unit includes an output logic gate connected to said logic output bus, and wherein said first storage means is a first flip-flop connected to said logic input bus, and said second storage means is a second flip-flop connected to said first flip-flop, and in which an output terminal on each of said flip-flops connects to said output logic gate.

3. The controller as recited in claim 2, which includes:

a BRT bus;

a SET bus; and an operation decoder connected to said memory matrix to receive operation codes and selectively generate in response thereto an operation signal to the BRT bus and an operation signal to the SET bus;

wherein said BRT bus is connected to said first flip-flop and to said second flip-flop, and said SET bus is connected to said first flip-flop and said second flip-flop.

4. The controller as recited in claim 3, which includes:

an XIO bus; and a second logic gate connected between said logic input bus and said first flip-flop, wherein said operation decoder selectively generates an operation signal to said XIO bus in response to operation codes received from said memory matrix, and wherein said XIO bus is connected to said second logic gate.

5. The controller as recited in claim 1, in which each output circuit includes a flip-flop and a logic gate, wherein said flip-flop has an output terminal connected to said logic gate, an output terminal connectable to an external device, an input terminal connected to said logic output bus, and a clock terminal connected to receive an activate signal from said address decoder; and wherein said logic gate has an input terminal connected to receive an activate signal from said address decoder and an output terminal connected to said logic input bus.

6. The controller as recited in claim 5, which includes a SET bus and an operation decoder connected to said memory matrix to receive an operation code and generate in response thereto an operation signal to the SET bus, wherein said SET bus is connected to the clock terminals on said output circuit flip-flops.

7. The controller as recited in claim 1 wherein said logic input bus contains not more than one electrical conductor.

8. A controller comprising:
a memory operable to store a set of binary words and including means for selectively reading said binary words;
a plurality of input circuits;
an output circuit;
a logic input line connected to said input circuits;
a logic output line connected to said output circuit;
an address decoder connected to said memory, connected to said output circuit, and connected to said input circuits; and
a central logic unit connected to said memory, connected to said logic input line, and connected to said logic output line, said central logic unit having first and second storage means connected to receive operation signals from said memory and in response thereto selectively perform one of the following operations: read and store in said first storage means the condition of said logic input line, shift and store in said second storage means the stored result of a read operation, and generate a digital signal to said output circuit which is responsive to the results stored in said first and second storage means.

9. The controller as recited in claim 8 in which said first storage means is connected to said logic input line and to said memory, and in which said read and store operation is performed when a read operation signal is read from said memory to said central logic unit and one of said input circuits is addressed by said address decoder.

10. The controller as recited in claim 9 in which said first storage means is a flip-flop which is stable in either a first logic state or a second logic state, wherein the condition of said logic input line is applied to said first flip-flop when said read and store operation signal is generated, and wherein said first flip-flop is driven to one of its logic states by the logic state of said logic input line during the read operation.

11. The controller as recited in claim 9 in which said said second storage means is connected to both said first storage means and to said memory, and wherein said shift and store operation is performed when a BRT operation signal is read from memory to said second storage means.

12. The controller as recited in claim 10 in which said second storage means is a flip-flop connected to said first flip-flop and connected to receive a BRT operation signal from said memory, and wherein the logic state of said first flip-flop is shifted to said second flip-flop when the BRT operation signal is read from memory.

13. The controller as recited in claim 11 in which said central logic unit includes an output logic gate having a first input terminal connected to said first storage means, a second input terminal connected to said second storage means, and an output terminal connected to said logic output line.

14. The controller as recited in claim 12 in which said central logic unit includes an output OR gate having a first input terminal connected to said first flip-flop, a second input terminal connected to said second flip-flop, and an output terminal connected to said logic output line.

15. The controller as recited in claim 13 in which the memory connects to said output circuit through a SET bus, said SET bus connects to said first and second storage means, and said central logic unit operates to generate a digital signal to said output circuit when an operation signal is generated on said SET bus and said output circuit is addressed by said address decoder.

16. The controller as recited in claim 14 in which said output circuit connects with said memory and the logic state generated on said logic output line by said central logic unit is applied to said output circuit when a SET operation signal is received.

17. The controller as recited in claim 16 in which said SET operation signal is applied to said first and second flip-flops in said central logic unit to drive each into one of its two logic states.

18. A controller comprising:
a memory operable to store a set of binary words and including means for selectively reading said binary words;
a plurality of input circuits;
a logic input bus connected to said input circuits;
a logic output bus;
an address decoder connected to said memory and connected to said input circuits;
an operation decoder connected to receive not more than two bits from each word read from memory and in response thereto generate a set of operation signals;
a central logic unit connected to said operation decoder, connected to said logic input bus, and connected to said logic output bus, said central logic unit being responsive to said operation signals received from said operation decoder to selectively perform one of the following operations: read and store the condition of said logic input bus, shift and store the result of a previous read operation, and generate a digital signal to said logic output bus which is responsive to the stored results; and
an output circuit which includes,
a flip-flop connected to said logic output bus and to said address decoder, wherein the state of said flip-flop is determined by the logic signal generated on said logic output bus when the output circuit is addressed by said address decoder.

19. The controller as recited in claim 18 in which said output circuit is connected to receive a SET operation signal from said operation decoder and said output circuit includes a logic gate having a first input terminal connected to said address decoder, a second input terminal connected to said flip-flop, and an output terminal connected to said logic input bus.

20. The controller as recited in claim 19 in which said output circuit flip-flop is connected to receive said SET operation signal and said flip-flop and said logic gate are connected to said address decoder to be addressed together,
wherein the state of said flip-flop is determined by the logic state of said logic output bus only when the output circuit is addressed by said address decoder and said SET operation signal is simultaneously received from said operation decoder.

21. A controller which comprises:
a memory containing a set of instructions, each instruction including a two-bit operation code and an address code, said memory including means for selectively reading said instructions;
an output circuit;
a plurality of input circuits, each input circuit having an input terminal and an output terminal, and each input circuit being operable to test the condition of an input device connected to its input terminal and to generate a corresponding logic signal at its output terminal;
a logic input bus connected to the output terminal of each input circuit;
an address decoder connected to receive the address code in each instruction read from memory and in response thereto address one of said input or output circuits by generating an activate signal thereto;
an operation decoder connected to receive the two-bit operation code in each instruction read from memory, and in response thereto generate one of four separate operation signals wherein said operation signals are each associated with an operation to be performed; and
a central logic unit which includes a first flip-flop connected to said operation decoder, connected to said output circuit and connected to said logic input bus, and a second flip-flop connected to said operation decoder, to said output circuit and to said first flip-flop, wherein said central logic unit is responsive to said one of said operation signals to perform one of the following said operations, (1) store the logic signal generated by an addressed input circuit in said first flip-flop, (2) store the inversion of the logic signal generated by an addressed input circuit in said first flip-flop (3) shift the logic state stored in said first flip-flop to said second flip-flop, and (4) generate a command signal to said output circuit, the logic state of which is determined by the logic state of said first and second flip-flops.

22. The controller as recited in claim 21 in which the input circuits are connected to said central logic unit by a logic input bus comprised of a single electrical conductor.

* * * * *

UNITED STATES PATENT OFFICE
CERTIFICATE OF CORRECTION

Patent No. 3,810,118            Dated May 7, 1974

Inventor(s) William W. Kiffmeyer

It is certified that error appears in the above-identified patent and that said Letters Patent are hereby corrected as shown below:

Column 3, line 57,      "as" should be -- an --

Column 3, line 57,      "an", first occurrence, should be -- as --

Column 5, line 58,      "Q" should be -- $\bar{Q}$ --

Column 5, line 60,      "A" should be -- An --

Column 6, line 2,      "Q", second occurrence, should be -- $\bar{Q}$ --

Column 6, line 8,      "Q", both occurrences, should be -- $\bar{Q}$ --

Column 6, line 57,      "Q" should be -- $\bar{Q}$ --

Column 6, line 60,      "Q" should be -- $\bar{Q}$ --

Column 8, line 22,      "Q" should be -- $\bar{Q}$ --

Column 8, line 40,      "Q" should be -- $\bar{Q}$ --

Column 8, line 54,      "Q" should be -- $\bar{Q}$ --

Column 10, Claim 1, Line 24,      after "matrix" the following should appear -- each of said distinct operation signals being associated with one of four distinct operations to be performed, --

Column 12, Claim 11, Line 1,      "said" should be deleted

Signed and sealed this 17th day of September 1974.

(SEAL)
Attest:

McCOY M. GIBSON JR.            C. MARSHALL DANN
Attesting Officer               Commissioner of Patents